United States Patent [19]
Knollman

[11] 3,914,559
[45] Oct. 21, 1975

[54] UNIVERSAL PBX LINE CIRCUIT FOR KEY AND NON-KEY SERVICE

[75] Inventor: Dieter John Henry Knollman, Arvada, Colo.

[73] Assignee: Bell Telephone Laboratories, Incorporated, Murray Hill, N.J.

[22] Filed: Nov. 7, 1974

[21] Appl. No.: 521,649

[52] U.S. Cl. .............. 179/99; 179/18 J; 179/15 AT
[51] Int. Cl. .............................................. H04m 1/00
[58] Field of Search ............ 179/18 F, 18 FA, 18 J, 179/18 AD, 18 BC, 42, 99, 15 BY, 15 AQ, 15 AT, 84 R, 84 A, 81 R, 1 H

[56] References Cited

UNITED STATES PATENTS

| | | | |
|---|---|---|---|
| 3,239,610 | 3/1966 | Morse et al. | 179/99 |
| 3,436,488 | 4/1969 | Barbato et al. | 179/99 |
| 3,519,757 | 7/1970 | Anderson | 179/18 J |
| 3,637,939 | 1/1972 | Fabiano | 179/18 F |
| 3,647,980 | 3/1972 | Fabiano | 179/99 |
| 3,715,516 | 2/1973 | Ebrahimi | 179/99 |
| 3,787,631 | 1/1974 | Lewis | 179/15 AT |
| 3,789,152 | 1/1974 | Medill et al. | 179/99 |
| 3,789,154 | 1/1974 | Medill | 179/99 |

*Primary Examiner*—Thomas A. Robinson
*Attorney, Agent, or Firm*—H. R. Popper

[57] ABSTRACT

A line circuit for a time division switching PBX is disclosed which can serve conventional non-key telephone sets as well as pick-up key telephone sets having access to other telephone lines that may be served by prior art relay-operated key telephone line circuitry. The line circuit has a port appearance in the time division network and an electronic scan point for reporting the switchhook state of the associated telephone set. The circuit contains two three-state flip-flops for correctly responding to the busy, idle or hold states that may be imposed by the associated telephone set and for distinguishing conventional A lead potentials when used with one or more conventional pick-up key telephone sets. No adjustment is required for operating with telephone sets that have no pick-up keys regardless of whether or not these sets maintain the A lead open-circuited or grounded.

11 Claims, 6 Drawing Figures

UNIVERSAL PBX LINE CIRCUIT FOR KEY AND NON-KEY SERVICE

BACKGROUND OF THE INVENTION

This invention relates to private branch exchange telephone systems and more particularly to such exchanges in which both conventional telephone stations as well as different kinds of key telephone lines must be served.

A key telephone set is a telephone set that has pick-up key access to one or more central office lines as well as a hold button for placing any of the lines in the holding state. When two or more key telephone sets have access to one or more lines in common, it has been the practice to append an auxiliary equipment to each such line so that the holding state can be controlled by any of the telephone sets and so that distinctive lamp illumination may be provided to the line's lamps at each of the pick-up keys at the several telephone sets capable of accessing it. the auxiliary key telephone unit monitored the state of the A lead ground that was normally present when any of its associated key telephone sets had the appropriate pick-up key operated. The auxiliary key telephone unit responded to the removal of the A lead ground by the operation of the hold button at any of the sets and inserted a holding bridge across tip and ring conductors toward the PBX switching train. In addition to providing for the control by any of the associated telephone sets of the common holding bridge, the auxiliary unit also served to detect ringing of its associated line and to steer a distinctive lamp illumination rate to the corresponding line lamps. An example of such a prior art key telephone unit is disclosed in R. E. Barbato U.S. Pat. No. 3,436,488 issued Apr. 1, 1969 which circuitry is also commonly known as the "400D" circuit manufactured by the Western Electric Company.

While a key telephone system may be used without a local switching network, it turns out that the majority of existing key systems are installed in PBXs. In the prior art electromechanical switching systems, it was immaterial to the local PBX switching train whether a given PBX line served only a single non-key extension or was accessible by key telephone pick-up keys to a number of different telephone sets. The only circuit difference in the two situations was the use of the auxiliary key telephone equipment when the lines served key telephone sets.

As the technology of electronic telephone switching has become more advanced it has occurred to me that some of the features provided in the prior art interface key telephone unit, such as the above-mentioned 400D key telephone unit, might better be provided integrally with the line circuit itself rather than as a somewhat cumbersome appendage as in the prior art electromechanical switching systems. However, the market for telephone service is highly complex and it may well be that while some telephone customers might be willing to pay for the improvements in service that will be made possible by integrating key telephone unit functions into the line circuit, there may be other telephone customers who would not want all of their lines to be served by the newest technology line circuit. In actual practice, it must be anticipated therefore that a given local switching installation may have to serve some telephone sets that may have pick-up key access to lines served by prior art auxiliary key telephone line circuitry.

It is the general experience in the telephone industry that the average key telephone set installation remains unaltered for an average of only two years. Rearrangement and rewiring of key systems in face account for a substantial part of the cost of service. Equipment installed one day at one customer's location will often be reused at a later date somewhere else in a telephone system. Under such field conditions it would be advantageous for the telephone company to be able to use, at least occasionally, the same type of line circuit to serve either a key telephone set or an ordinary, non-key telephone set.

A problem arises, however, when it is attempted to manufacture a line circuit that can be used in the field flexibly to serve either a key telephone set or an ordinary telephone. A conventional key telephone line circuit is built to respond to line pick-up as the simultaneous occurrence of tip and ring continuity and the appearance of an A lead ground. An ordinary telephone set does not have an A lead and so the key telephone line circuit cannot properly respond to the ordinary telephone set's switchhook state. While it might be possible to strap the A terminal of the line circuit to ground, the craftsman may forget to do this on the first field trip or he may forget to remove the strap should it later be desired that the line circuit serve a key telephone set. Accordingly, it would be advantageous to have a key telephone line circuit which could on occasion be used simply to serve an ordinary telephone set without requiring the craftsman to pay any attention to the state of the A lead sensing terminal of the line circuit.

SUMMARY OF THE INVENTION

The foregoing and other objects have been achieved in one illustrative embodiment of my invention in which a line circuit is provided which will serve both key and non-key telephone sets and which will control the application and detection of ringing signals for a key telephone line of a PBX regardless of whether relay or electronic-type line circuits are serving the lines accessible to any of the other buttons of any of the key telephone sets in the customer's system.

In accordance with one aspect of my invention, the port circuit for the line is equipped with a scan point to inform the central controller of the local switching system whether any station set that has pick-up key access to that line has the line in an off-hook or on-hook state. Circuitry associated with this scan point in the line circuit automatically senses whether the line circuit is actually associated with a key telephone set so that the scan point accurately reflects the line activity at the station. My circuit correctly responds to the changes in the A lead potential as the hold button at any of the served key telephone sets is operated. On the other hand, the A lead of my line circuit may be left either grounded or opened when the line circuit serves a conventional (non-key) telephone set of the PBX. In all of these cases, the line circuit of my invention furnishes the proper scan point information to the central controller.

The line circuit of my invention functions without adjustment for either key or non-key telephone sets. It includes two flip-flops each of which can exhibit three stable states. When the associated key or non-key station set has the line busy, one or the other of the flip-flops is in its third state. Which particular one of the two flip-flops is in that state is determined by whether station loop (tip and ring) current is present or not. During dialing the two flip-flops switch between their third states. My circuit is arranged to sense for the presence of station loop current at the instant the A lead undergoes a transistion from grounded to open-circuited. If loop current is present, one of the flip-flops is placed in its set state while the other is reset to indicate the hold condition. (If loop current is not present at the aforementiond instant the one flip-flop is reset and the other of the flip-flops is set to represent the idle condition.)

Once the flip-flop states have been so established to represent the hold condition the subsequent cessation of loop current causes the other flip-flop to also be set. Once the flip-flops represent the idle condition a subsequent resumption of loop current (without the A lead being grounded) causes the set flip-flop to be reset so that both flip-flops are then in the reset state.

Accordingly, the combination of my two flip-flops defines two switching states for each of the busy/idle and hold conditions of the associated line: the two busy states are defined by a grounded A lead and the presence or absence respectively of loop current since the line is busy during dialing even when the loop is open; the two hold states are defined by an open A lead and the initial presence of loop current after which the loop current is permitted to cease or be re-established; the two idle states are defined by an open A lead and the initial absence of loop current after which loop current is permitted to be re-established (because the station is talking on another line).

DESCRIPTION OF THE DRAWING

The foregoing and other objects and features of my invention may become more apparent from the ensuing description and drawing in which:

FIGS. 2–6 are to be arranged.

GENERAL DESCRIPTION

Figures 1, 7:
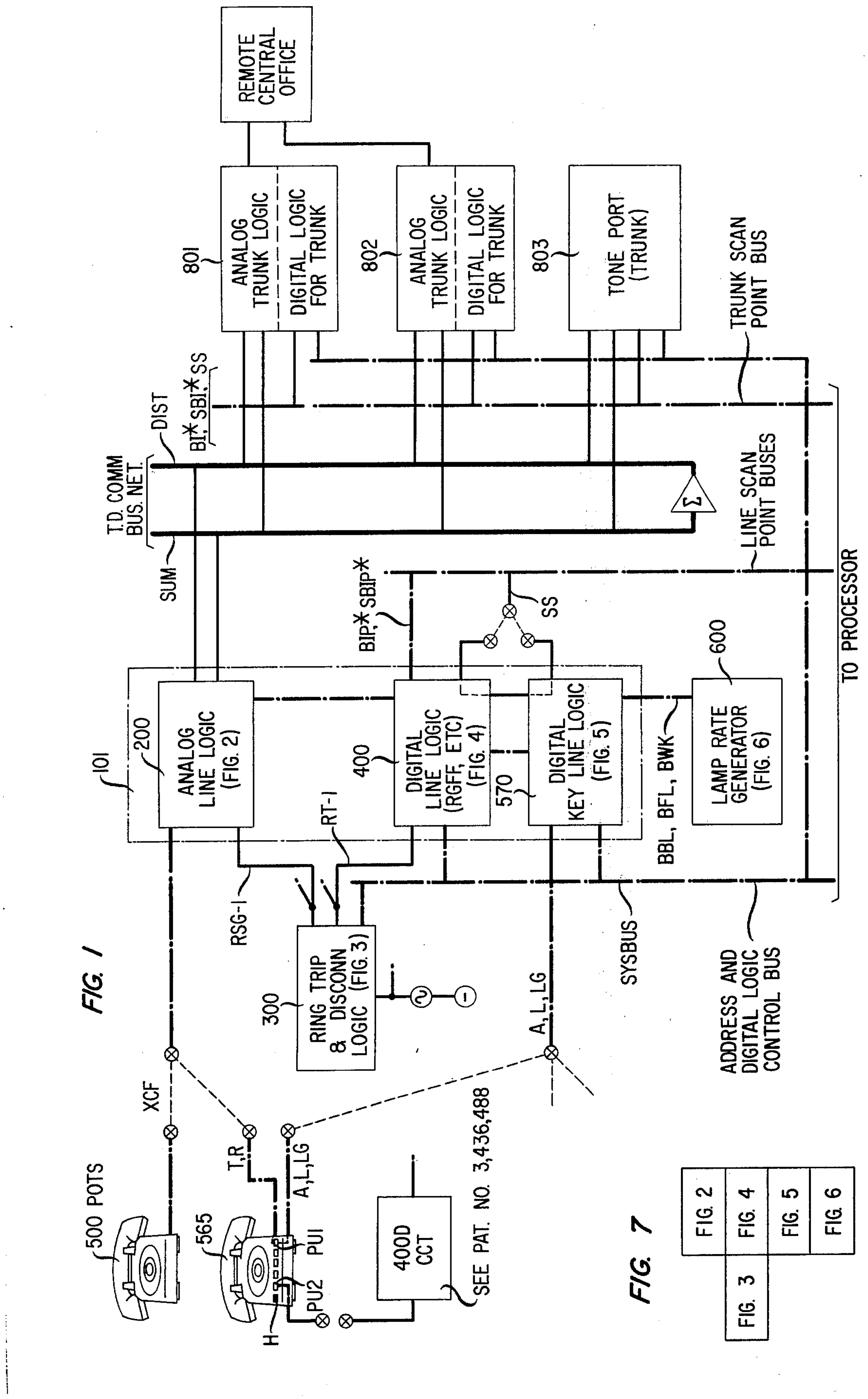
FIG. 1 is a block diagram of the organization of the line circuit components as they are arranged in one illustrative embodiment of my invention.
FIG. 7 shows how

Referring now to FIG. 1, there is shown an exemplary PBX in which the line circuit of my invention may find useful application. The exemplary PBX employs a time division solid state crosspoint switching network T.D. COM BUS NET over which communications connections may be established among the line circuits or between line circuits and trunk circuits to a remote central office.

As described in any of the recent U.S. Pat. Nos. to D. G. Medill et al 3,789,152 and 3,789,154 both issued Jan. 29, 1974 or to T. G. Lewis et al, 3,787,631 issued Jan. 22, 1974, each line and trunk circuit includes a recirculating shift register (not shown in FIG. 1 but shown in FIG. 4 for an illustrative line circuit and in FIGS. 7 and 8 for an illustrative trunk circuit). The time division connections are affected by means of the sum and distribute SUM, DIST buses and the summation amplifier Σ as described in the aforementioned prior art patents.

The accessing of the line and trunk circuits for loading their respective shift registers with the recirculating bit identifying the time slot assigned is under the control of a processor, also as foregoingly described.

While the line and trunk circuits, also called port circuits in the aforementioned patents, will normally have only one recirculating bit in their respective shift registers, the tone port trunk includes a shift register in which a number of bits may be in circulation since more than one line may require a tone, such as dial tone, during its assigned time slot.

The prior art time division switching system of U.S. Pat. No. 3,789,152 was able to serve a conventional non-key telephone set as well as a new type of electronic key telephone set via a six-wire cable that included tip and ring conductors and a pair of data send and receive conductors. My present invention is directed to a line circuit which can be connected to serve either a conventional no-button telephone set 500 or a conventional key telephone set 565 which includes a hold button H and a plurality of pick-up keys PU1, PU2. . .for giving telephone set 565 pick-up key access to any of a plurality of different telephone lines.

In FIG. 1, pick-up key PU1 is associated with the electronic line circuit of my invention whereas pick-up key PU2 has access to a line with which there is associated a conventional prior-art auxiliary key telephone unit 400D. It is to be understood that it is not required that telephone set 565 be given such access to a line served by such an auxiliary circuit but it is useful for tutorial purposes to show this in the drawing thereby to point out an aspect of the flexibility of the line circuit of my invention. It is to be further understood that, when used, circuit 400D may be connected to the tip and ring conductors of a line circuit similar to circuit 101 but which may omit circuits 570 and 600 and which is therefore similar to those portions of circuit 101 that are provided for serving the conventional, no-button telephone set 500. See, in this regard the above-mentioned copending application of J. F. O'Neill.

Figure 2:
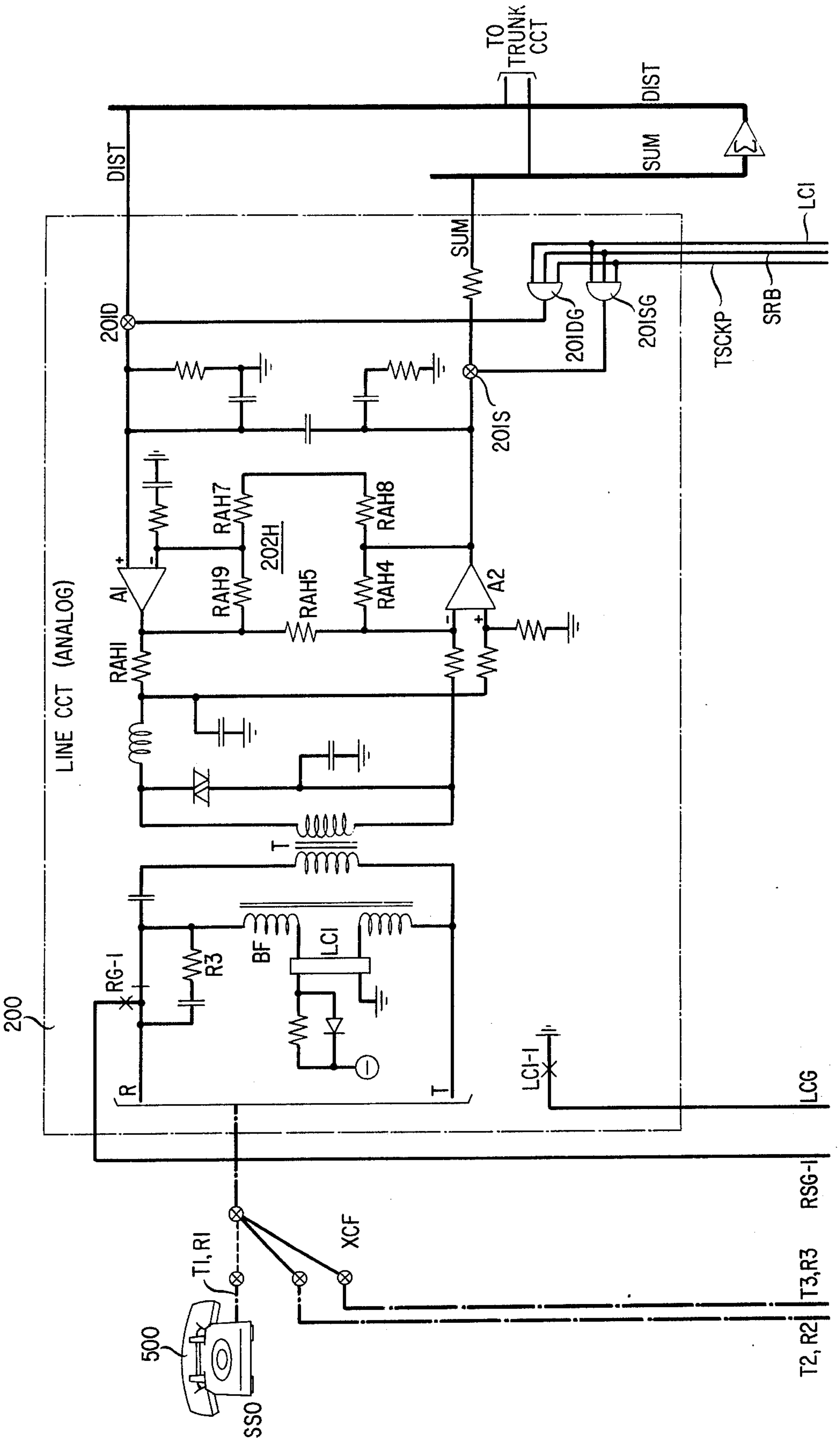
FIG. 2 shows a conventional no-button telephone set, cable cross-connect field, and the voice switching interface of the line circuit with the time division network of the PBX in which my invention may be employed.
Figure 4:
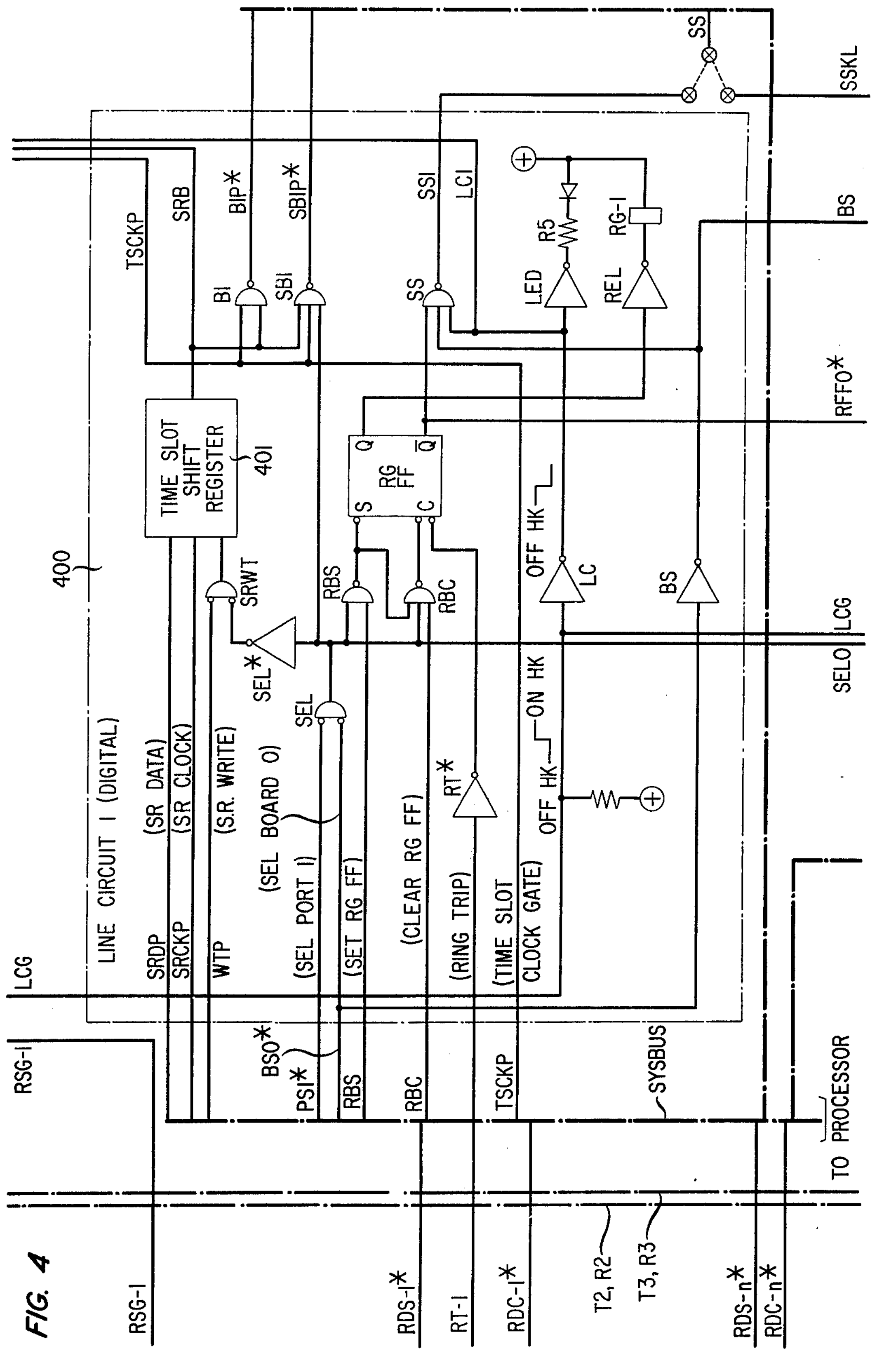
FIG. 4 shows a portion of the digital line circuit circuitry used whether the line circuit serves no-button or key telephone sets and includes, interalia, the port circuit shift register and the ringing control flip-flop.

In the illustrative embodiment, the tip and ring conductors of either telephone set 500 or 565 are connected to the tip and ring conductors of the analog line logic portion 200 of line circuit 101. The line logic portion 200 contains the time division hybrid that sends and receives audio samples to the time division communications bus network. The solid state switches 201S, 201D associated with the time division hybrid in circuit 200 are controlled by a signal sent over leads TSCKP, SRB and LCO from digital line logic 400 which contains the aforementioned time slot bit recirculating port shift register 401. Details of the analog line logic 200 and of the digital line logic 400 are shown in FIGS. 2 and 4, respectively.

Figure 3:
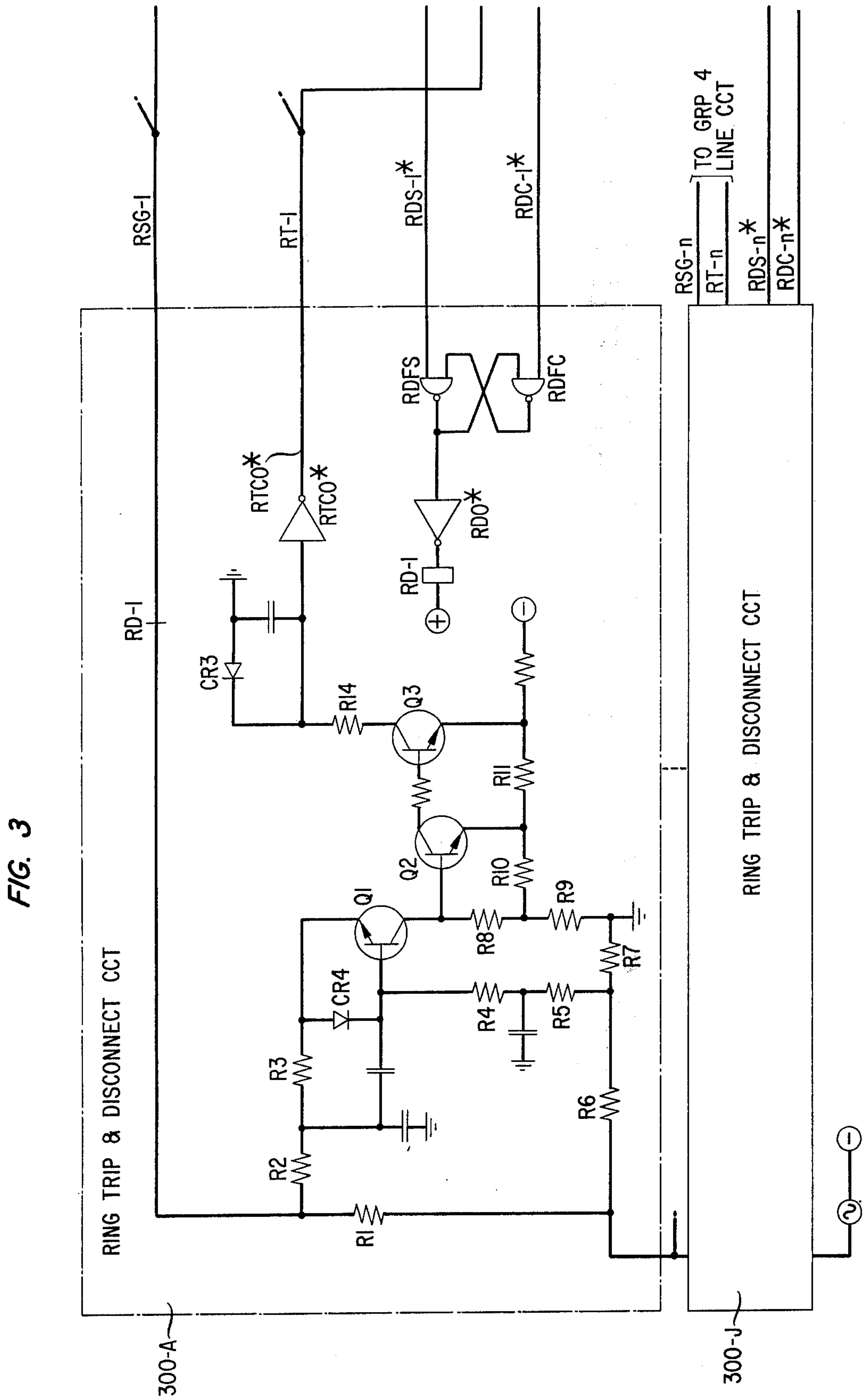
FIG. 3 shows the common ring-trip and disconnect circuit portion of the line circuit. Aspects of the operation of this figure together with that of certain of the circuitry shown in FIGS. 2 and 4 are also the subject of copending patent applications filed of even date herewith by J. F. O'Neill entitled "Station Loop Control Arrangement for Telephone Switching System," Ser. No. 521,650 and by D. G. Hill et al, Ser. No. 521,651, entitled "Ringing Control Circuitry with Shared Ringing Loop Current Detector;"

In addition to the port circuit shift register 401, digital line logic 400 includes a ringing control flip-flop RG that may be set or reset by signals from the processor. The processor addresses the port circuit via the address leads and sends a set or reset command over the digital logic control leads of the system bus SYSBUS. The ringing control flip-flop maintains relay RG-1, whose winding is shown in FIG. 4, operated or released. Contacts of relay RG-1 in circuit 200, FIG. 2, establish continuity between the ring conductor toward the telephone set and bus RSG-1 from the common ring-trip and disconnect circuit 300, FIG. 3. Circuit 300 makes available to bus RSG-1 a 20-cycle, 130-volt a.c., ringing generator superimposed on a 48-volt d.c. battery. As described in the aforementioned copending application of J. F. O'Neill entitled "Station Loop Control Arrangement for Telephone Switching Systems", filed of even date herewith, the ring-trip and disconnect circuit 300 may serve a number of other line circuits in a group of up to 32 line circuits which includes the line circuit illustrated in FIG. 1. Any of these other line circuits in the group served by line circuit 300 may have its ringing control flip-flop accessed by the processor instead of the illustrative line circuit and up to four circuits in the group may be selected to receive ringing so long as each such circuit has its active interval during a different 1-second time period. Circuit 300 detects when any of the line circuits which is receiving ringing is placed in the off-hook state by the station user in response to ringing. Circuit 300 then delivers on lead RT-1 a reset signal to all of the line circuit ringing control flip-flops in the group which signal resets the only flip-flop that was set to deliver active ringing. As described in the aforementioned O'Neill application, since the normal ringing interval is one second of active ringing followed by a three-second silent interval, up to four line circuits in the group of line circuits served by a common ring-trip may receive ringing and ring-tripping, one such line circuit being serviced during each successive one-second interval.

The analog line logic 200 includes a loop supervisory line relay LC1 (FIG. 2) that monitors the continuity of the tip and ring leads toward the telephone set and which is operated when any telephone set associated with line circuit 101 is in the off-hook position. Contact LC1-1 of this line relay selectively grounds lead LCG to control the state of scan point bus SS. The illustrative system also contains a busy-idle bus BIP* and a selected busy-idle bus SBIP* as was disclosed in the aforementioned U.S. Pat. Nos. 3,789,631 etc. Briefly, the busy-idle bus BIP* exhibits a low signal condition when the recirculating time slot indicating bit in any port circuit shift register appears in the shift register output during the occurrence of a system clock pulse on lead TSCK. Bus SBIP* functions similarly except that only the port circuit shift register of a line circuit addressed by the processor over bus SYSBUS is permitted to control its state.

Figure 5:
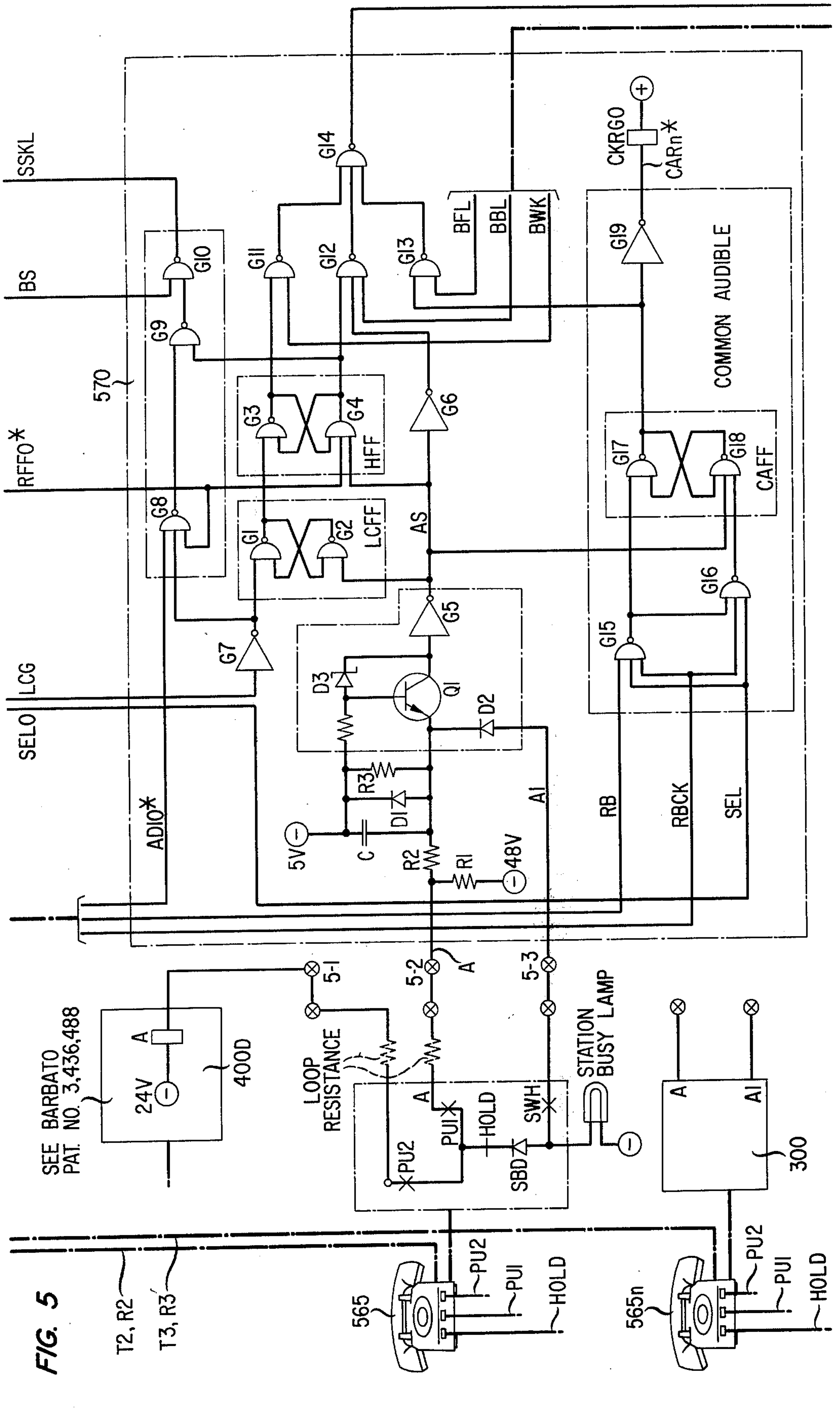
FIG. 5 shows a conventional pick-up key telephone set, more of the cable cross-connect field and the A lead logic forming a portion of my present invention including the two, three-state flip-flops.
Figure 6:
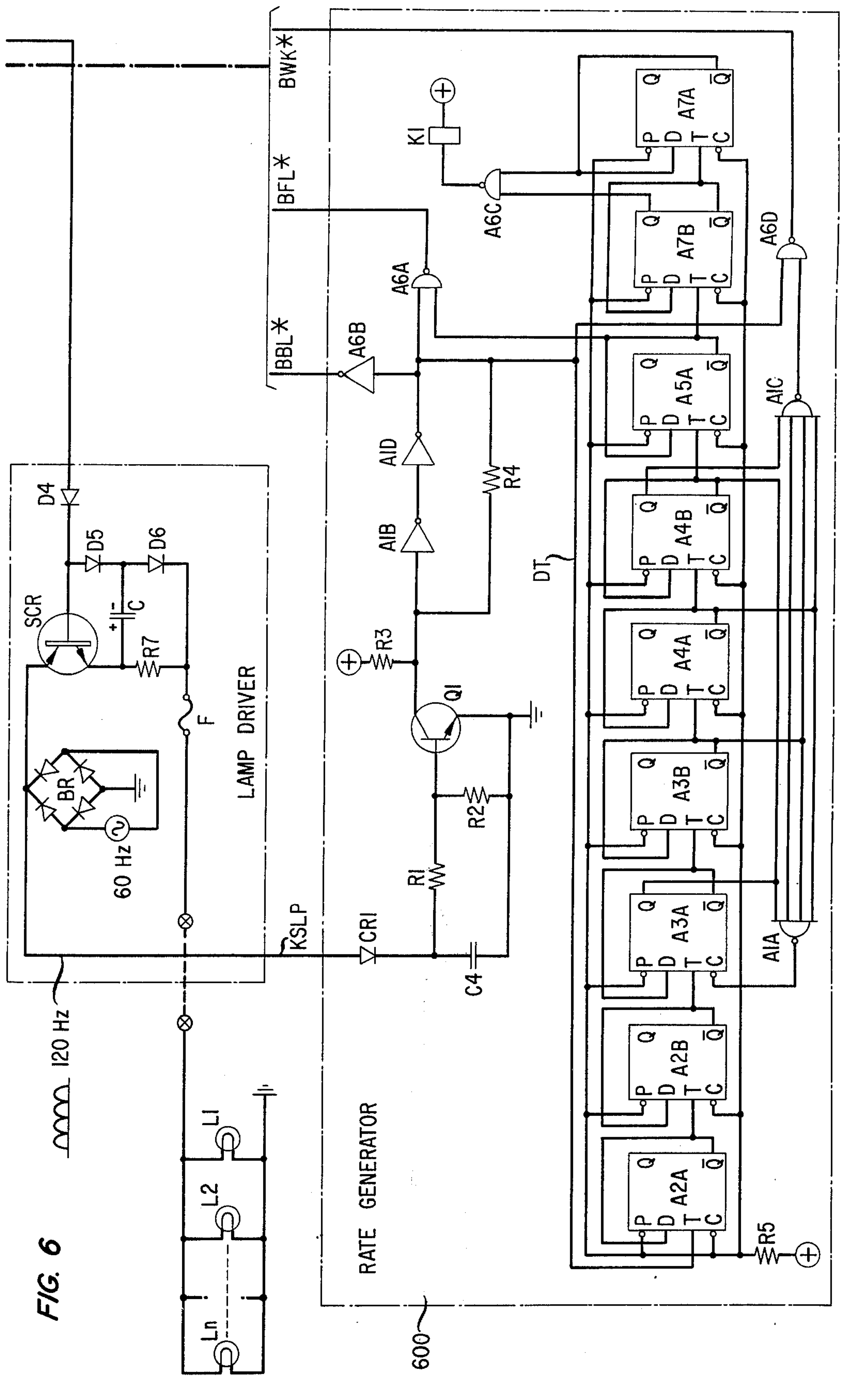
FIG. 6 shows a key rate generator for generating the wink, flash and zero crossing signals used by the circuitry of FIG. 5. Aspects of the operation of this figure together with certain portions of FIG. 5 constitute the subject matter of my copending application filed of even date herewith entitled "Lamp Power Supply Arrangement for Key Telephone System," Ser. No. 521,648.

When the line circuit 101 of my invention is cross-connected to serve a line accessible to a key telephone set such as set 565 there are cabled out to the set and cross-connected to its relevant terminals the tip and ring conductors T, R, and the analog line logic 200 and the hold sensing A lead and the lamp power L lead from the digital key line logic 570. In FIG. 1 pick-up key PU1 when operated by the user of set 565 serves to access line circuit 101. The details of a circuit 570 are shown in FIG. 5 which will be described hereinafter. The distinctive illumination rates for the lamps at key telephone set 565, and any other key telephone sets which are also cross-connected to line circuit 101, are provided to digital line logic 570 by lamp rate generator 600 over leads BBL, BFL, BWK.

DETAILED DESCRIPTION

The three parts of line circuit 101 are shown in FIGS. 2, 4, and 5 and comprise analog line logic circuit 200, digital line logic 400 and digital key line logic circuit 570. Circuits 200 and 400 are used when the line circuit is cross-connected to handle a no-button telephone set 500 or a line of a key telephone set for which a 400D auxiliary circuit is specified by the telephone customer. When integrated key service is specified, as hereinafter more fully to be explained, circuits 570 and 600 are also connected. Ring-trip and disconnect logic 300 of FIG. 3 serves line circuit 101 whether the latter is cross-connected for use with no-button set 500 or key sets 565.

The telephone stations of the illustrative time division switching system, in which the line circuit of my invention may advantageously be employed obtain voice communication with each other and with the trunk circuits 801, 802 or 803, FIG. 1, by means of a time slot assigned the digital line logic 400 by the remote processor (not shown). Briefly the processor addresses the digital line logic 400, FIG. 4, over the system bus SYSBUS causing a single bit to be inserted in the port circuit shift register 401 during an appropriate count of the system clock.

The time slot data bit is applied to the register on lead SRDP, the shift register clock signal is applied on lead SRCKP, and the write enable signal for loading the shift register is applied on WTP. When the bit recirculating in shift register 401 appears at the shift register output, gates 201DG, 201SG, FIG. 2, enable the time division solid state crosspoints 201D, 201S, which connect the hybrid 202H of the analog logic 200 to the time division communication network buses SUM and DIST. A description of the addressing of the port circuit shift register and of the operation of a time division hybrid is contained, inter alia, in the aforementioned U.S. Pat. No. 3,787,631 and in the copending application Ser. No. 498,056 of J. M. Elder, Jr., filed Aug. 16, 1974. In the '631 patent, a line relay transformer was employed which served the purpose both of an impedance matching transformer as well as that of a line relay. In the illustrative embodiment shown in FIG. 2 of the present application, however, a separate impedance transformer T and line relay LC1 are employed together with a battery feed inductor BF.

In addition to operating the time division switches, the appearance of the time slot bit at the output of shift register 401 enables gate BI and partially enables gate SBI also as described in the aforementioned patent. Gate BI drives the common busy-idle bus BIP* serving a group of port circuits. The common busy-idle bus will then exhibit the low signal condition during the interval that any port circuit in the group is assigned an active time slot. Bus SBIP* is similar to bus BIP* except that it exhibits the low signal state during a time slot only if the addressed port circuit has an assigned time slot. The tip and ring leads of the line circuit are brought out to a punching of cross-connect field XCF and are cross-connected therein to the tip and ring conductors of conventional non-key set 500 or to the tip and ring conductors accessed by the pick-up keys of one or more pickup key telephone sets **565, 565*n*. In FIG. 5, it is assumed that pick-up key PU1 of set 565 controls the A lead for an integrated key service line and so is connected to digital key line logic 570 and that pick-up key PU2 controls the A lead for a conventional service key telephone line having an intervening auxiliary key unit 400D**.

When the installer makes the cross-connections in frame XCF and only an ordinary non-key telephone set 500 is going to be served by line circuit 101, there will be no cross-connections to terminals 5-1, 5-2 or 5-3. If conventional, applique type of key service is required only cross-connection 5-1 to the 400D circuit in FIG. 5 and the T1, R1 cross-connections in FIG. 2 are made.

At this point it may be possible to appreciate the differences in environment to which the line circuit 101 may be subjected. Not only may leads A and A1 be connected or left floating from time to time in a given PBX as the craftsman makes changes to accommodate the different telephone sets that the customer may desire to have installed or removed but, in addition, the local battery voltages will differ from one PBX installation to another. The digital logic circuit of FIG. 5, however, has in accordance with my invention been designed so that the correct switchhook state of the associated telephone set will be reported to scan point bus SS by the associated line logic circuit of FIG. 4 regardless of whether a conventional telephone set 500 or a pick-up telephone set 565 is involved and regardless of the variation in steady state battery potential that may exist in different customer installations.

STATION PICKS UP LINE

When the station set 565, FIG. 5 has its pick-up key PU1 depressed and the handset is off-hook, a circuit is completed from ground on lead A1, switchhook contact SW, station busy diode SBD, the hold button break contact HOLD and the pick-up key make contact PU1 to punching 5-2 and the A lead of digital line circuit 570. The ground on lead A raises the potential at the junction of resistors R1 and R2 from its normal value of approximately −24 volts to a value which is just slightly negative.

The junction point of resistors R1 and R2 is normally maintained at the value of −24 volts when no station has the line picked up by means of voltage divider resisters R1, R2, and R3 which are connected between the +5 volt logic level voltage source and the negative 48-volt battery. The negative 24-volt potential was chosen so that circuit 570 will exhibit the same idle potential on its A lead as would be exhibited on the A lead of conventional auxiliary key unit 400D. In this manner the polarity of A lead current demanded by diode SBD in set 565 may be permitted to flow whether set 565 is used with a 400D circuit or with the integrated key circuit 570.

When pick-up key PU1 is operated to pickup the line served by line circuit 101, the potential at the junction point of resistors R1 and R2 is raised by station 565 grounding lead A. Transistor Q1, which is normally on, is turned off. Transistors Q1, diode D2, and diode D3 are an input circuit of active, "totem-pole" pull-up inverter gate G5. Gate G5 inverts the high input signal at the emitter of Q1 and applies it as a low signal to the lower input of NAND gate G2 of line circuit flip-flop LCFF.

The state of the station loop current is sensed by the line relay LC1 in FIG. 2 and its contact LC1-1 applies a ground signal on lead LCG to FIG. 4 whenever loop current is present. (Loop current can be interrupted by dialing, by station hang-up or by operating the hold button.) The ground (loop current present) signal on lead LCG is received as a low signal by inverter G7 in FIG. 5 which inverts the low and applies it as a high signal to the upper input of gate G1 of flip-flop LCFF. Accordingly, with the line off-hook and picked up at a station set, flip-flop LCFF has a high signal applied at the upper (external) input of its gate G1 and a low signal applied to the lower (external) input of its gate G2. This low signal forces the output of gate G2 high and consequently gate G1 will have a high signal applied to both of its inputs forcing its output low.

When flip-flop LCFF is in this reset state the low signal at its output forces the output of gate G3 of flip-flop HFF to the high signal state. Assuming that at this time the ringing control flip-flop RG, FIG. 4 has not been set so that the line circuit is not applying ringing, the signal on lead RFF* will be high. The signal on lead AS, at the output of gate G1, is low because of the A lead ground and this low signal which is applied to the lowermost input of gate G4 forces the output of gate G4 high. With a low external input to each of gates G3 and G4 of flip-flop HFF both gates produce high output signals and flip-flop HFF is said to be in the "2" state. Accordingly, with the line picked up and the station off-hook, flip-flops LCFF and HFF are said to be in the "0" and "2" states, respectively.

If now for some reason the station set should temporarily go on-hook while still maintaining the A lead grounded, as during dial pulsing, inverter G7 applies a low signal to the upper input of gate G1 forcing the output of gate G1 high. The output of gate G2 is forced high by the A lead ground placing flip-flop LCFF in the high-high or "2" state. Since the output of gate G4 of flip-flop HFF is forced high by the A lead ground, gate G3 of flip-flop HFF will now have high signals applied at both of its inputs, forcing its output low. With gates G3 and G4 in the "0" and "1" states, flip-flop HFF is said to be in the reset or "0" state. Accordingly, at this time flip-flops LCFF and HFF are in the "2" and "0" states, respectively.

If the station set returns to the off-hook condition while still maintaining the A lead grounded, inverter G7 applies a high signal to the upper input of gate G1 allowing its output to go low. The output of gate G2 is still maintained in the high signal state by the A lead ground and so the LC flip-flop returns to the "0" state. The removal of the high signal from the output of gate G1 forces the output of gate G3 to return to the high signal state. The A lead ground still forces the output of gate G4 high thereby returning flip-flop HFF to the "2" state.

In accordance with another aspect of the operation of my invention as shown in FIG. 5, protection against abnormal potentials is incorporated by R2 in conjunction with diodes D1 and D2. Should the telephone installer inadvertently short the A lead to a conductor on which ringing potential happened to be present, a potential of the order of 100 volts may be applied. Diode D1, however, conducts and limits the potential at the emitter of transistor Q1 to a maximum of +5.7 volts. Diode D2 clamps the negative-most excursion of the A lead to −0.7 volts while resister R2 (which illustratively may be 39 K ohms) limits the current through the clamping diodes D1 and D2 to approximately 2.5 milliamps.

STATION HOLDS LINE

When station 565 is off-hook and key PU1 is picked-up lead LCG is grounded (low signal). Inverter G7 delivers a high signal to the middle input of gate G8. Assuming that the ringing control flip-flop RG, FIG. 2 is not set, lead RFF* delivers a high signal to the lower input of gate G8. Assuming further that no special service feature signal is present, lead AD10 will also be high. Gate G8 having all of its inputs high delivers a low signal to the upper input of gate G9 forcing its output high. As previously described, when the line is off-hook and picked up the A lead is grounded forcing the output of gate G4 high. The high signal at the output of gate G9 allows lead SSKL at the output of gate G10 to go low when gate G10 is strobed by the BS lead pulse. Accordingly, the state of lead SSKL follows the (off-hook = low) state of lead LCG.

If the station user at set 565 should now operate the HOLD button, ground will be removed from terminal 5-2 and from the junction point of resistors R1 and R2. If no other station still has its pick-up key operated for this line, the junction point of resistors R1 and R2 will assume a potential of approximately −24 volts. This renders diode D2 conductive which clamps the emitter of transistor Q1 at a potential of one diode drop below ground. This low signal is applied to the input of active pull-up inverter gate G5 which inverts it and applies it as a high signal to the lowermost inputs of gates G2 and G4 of flip-flops LCFF and HFF, respectively. the operation of my invention, as shown in FIG. 5, capacitor C at the junction point of R2, D2 and the emitter of transistor Q1 operates to delay the transistion of voltage signals applied to lead A when a HOLD button is operated at set 565. This delay is incorporated to guarantee that a change in loop current that might be occasioned by the telephone subscriber hanging up instead of operating the HOLD button will appear on lead LCG before the change in A lead potential accompanying the release of the pick-up key contacts can be experienced on lead AS. However, when a hold condition is applied, ground is removed from the A first. When ground is so removed gate G5 applies a high signal to gates G2 and G4. Gate G4 accordingly now has all of its inputs in the high signal condition. (The uppermost input of gate G4 is high because the output of gate G3 is high. Gate G3 output is high because gate G1 output is low and gate G1 output is low because the line is off-hook. Lead RFFn* at the middle input to gate G4 is high because the station is not being rung and the lowermost input to gate G4 is high because the removal of ground from the A lead places a high signal on lead AS.) The output of gate G4 now goes low (equals "0") forcing the output of scanning control gates G9 and G12 to go high.

When line circuit 570 is scanned by the processor a high signal will be applied to lead BS at the upper input of KSS gate G10. Gate G10 has a high signal applied to its lower input by gate G9 since the output of gate G4 of the HFF flip-flop is high and the input of gate G8 is assumed to be high since lead LCG is still grounded causing lead KSSn* to go low. Accordingly, the removal of the A lead ground at the inception of the application of the hold state causes lead SSKL to exhibit a low signal condition. LEad SSKL is cross-connected in FIG. 4 to scanner response bus SS. Accordingly, scanner response bus SS exhibits a low signal state which is the same condition that is exhibited when the line was off-hook and picked up by a station set, i.e., the same state it exhibited prior to the operation of the hold button at set 565.

The removal of ground from the A lead while lead LCG is still grounded (low signal) causes flip-flop HFF to change from the "2" state to the "0" state. When the station user releases the hold button, the conventional mechanical linkage (not shown) in set 565 releases the depressed pick-up key PU1, disconnecting set 565 from conductors T, R at FIG. 2 thereby opening the loop and releasing line relay LC1. The release of relay LC1 at its contacts LC1-1 removes ground from lead LCG which goes high. Inverter G7 then applies a low signal to gate G1 forcing flip-flop LCFF to enter the "1" state and forcing the output of gate G8 to go high. Gate G9, however, is forced by the state of the HFF (gate G4 output low) to be in the high signal state. Accordingly, when circuit 570 is scanned by the appearance of a high signal on lead BS, gate G10 will have both of its inputs high and will report a low signal to lead SSKL and scan bus SS in FIG. 4, just as if the line were off-hook.

Accordingly, the circuitry associated with flip-flops LCFF and HFF conditions these flip-flops to represent an initial appearance of a hold condition by flip-flop states 0-1 and the subsequent or final holding state (occurring after subscriber loop current has been interrupted) to be represented by flip-flop states 1—1. At the onset of hold the scan bus SS reports the line off-hook and when the final holding state is achieved, the line is reported to the scan bus SS as off-hook.

It has heretofore been assumed that gate G1 of flip-flop LCFF was responding to the LCG lead ground at the instant that ground was removed from the A lead by the operation of the hold button. If, however, the station is on-hook there is no line current and if the A lead is open, gate G1 output will have been forced to the high signal state and gate G2 will have a low output due to the A lead open (lead AS high). Gate G9 can read the output of HFF gate G4 whenever the output of gate G8 is high. Flip-flop LCFF will therefore be in the "1" state. Flip-flop HFF has high signal inputs to gates G3 and G4 and is therefore in the "0" state.

If now the station goes off-hook line current causes relay LC1 to operate and to ground lead LCG. Inverter G7 applies a high signal to gate G1 of flip-flop LCFF and to gate G8. Assuming that leads AD10* and RFF* are high gate G8 output is low forcing the output of gate G9 high regardless of the state of HFF gate G4.

If, however, it had been assumed that the A lead was permanently grounded, lead AS will always be low forcing the output of gate G2 high. The output of gate G1 will now follow the state of lead LCG, going low when the line is off-hook and going high when the line is on-hook. The AS lead low will force gate G4 output to always be high allowing gates G3 and G9 to follow the state of the outputs of gates G1 and G8, respectively. Gate G3 controls output gate G11. Since gate G8 output follows the state of lead LCG, and since gate G9 has a high at its lower input from gate G4, the input to gate G10 lead SSKL to report the state of lead LCG to scan bus SS.

From the foregoing it is seen that only in the holding states does the signal on lead SSKL which is returned to scan bus SS, FIG. 4, fail to reflect the same state as the signal on lead LCG: in both the preliminary and final holding states the signal on lead SSKL is low just as if the line were actually off-hook. This off-hook report to the processor is the report that would be expected if a conventional holding bridge of the type disclosed in the aforementioned Barbato et al. U.S. Pat. No. 3,436,488 had been inserted across the tip and ring conductors between the telephone set and line logic 200, FIG. 2.

From the foregoing it can also be appreciated how an integrated circuit pack comprising circuits 200, FIG. 2, 400, FIG. 4, and 570, FIG. 5, can be assigned for use either to an ordinary telephone set with the A lead left either permanently floating or permanently grounded or to a key telephone set.

In the foregoing discussion it had been assumed that the ringing control flip-flop RG in FIG. 4 was not set either to apply ringing to the line or, as described in the copending application of J. F. O'Neill Case, to correct for a hold abandoned condition. Let it now be assumed that the signal on lead RFF* is low because, contrary to the previous assumption, the ringing control flip-flop is in fact set. If the circuitry of FIG. 5 is in the holding state, the low signal on lead RFF* will force HFF gate G4 output to the high signal state. The low signal on lead RFF* will also force the output of gate G8 to the high state. Gate G9 thus has both of its inputs high and applies a low signal to gate G10 forcing its output high. The high signal at the output of gate G10 applied to lead SSKL returns to the scan bus SS, FIG. 4, a signal that the line is on-hook. This is correct since, as described in the above-mentioned copending J. F. O'Neill application, the setting of the ringing control flip-flop RG, at the operated back contacts of its transfer contacts RG-1 in FIG. 2, opens the continuity of the tip and ring loop to the winding of relay LC1 releasing the line relay.

If the low signal on lead RFF* is received while the LCFF and the HFF are in the "0" and "1" states, respectively, i.e., in the initial holding state occasioned by the removal of ground from the A lead prior to the interruption of loop current by the release of the depressed hold button at set 565, the operation of the RG flip-flop responsive to the low signal on lead RFF* will cause lead LCG to go high thereby changing the state of the LC flip-flop to the "1" state. With flip-flops LCFF and HFF thus both set to the "1" states, the circuit is then instantaneously but temporarily put into the final holding state. However, the low signal on lead RFF* does not permit gate G4 to remain with the low output signal that it had been forced to exhibit at the onset of the holding condition. The low signal on lead RFF* forces the output of gate G4 high which means that the HFF flip-flop is in the "0" state. with the LCFF and the HFF now in the "1" and "0" states, respectively, this is the same as the one of the idle states previously described when the set is on-hook and the A lead is grounded. As was mentioned before, this condition can exist for an ordinary telephone set for which circuit 570 has its A lead permanently grounded or for a key telephone set which is idle but which has had its A lead accidentally shorted to ground by an inadvertent serviceman. In either case, the idle condition is correctly reflected to scan bus SS.

The outputs of gates G3 and G4 of the hold flip-flop HFF together with the output of gate G6 control the lamp logic G11, G12, G13, and G14 which determines what signals are presented to the SCR lamp driver circuit of FIG. 7. Gates G11, G12, and G13 at their respective lower inputs receive flash rate, steady rate and wink rate signals from circuit 600, FIG. 7. The signals on leads BFL, BBL, and BWK in these inputs are equal to "1" only during the "0" crossing interval of the key lamp supply. Whenever flip-flop CAFF is set, gate G13 is enabled to deliver flash rate signals via gate G14 to the SCR driver. Steady illumination control is provided whenever A lead ground is present, the low signal indicative thereof appearing on lead AS being inverter by the output of gate G6 and applied to enable gate G12. Wink rate control signals are steered from lead BWK through gate G11 whenever the HFF flip-flop is in state "1" or "2". Combinations of lamp rate signals may be gated through gates G11, G12, and G13 to gate G14 if more than one condition is met, e.g., if the LCFF and the HFF are in the "0" and "2" states, respectively (indicating one of the two busy states). Both the steady and wink rate inputs are gated through. This condition is not detectable since the steady rate masks out the wink rate.

It should be noted that with the line circuit of my invention there need be no holdover of lamp signaling at the conclusion of ringing. When the line goes off-hook in response to ringing, the output of gate G3 is forced high and the outputs of gates G6 and G4 are forced high thereby fully enabling gate G12 to deliver steady lamp illumination contemporaneously with line pickup.

Gates G15 through G19 comprise a common audible circuit. Common audible ringing is required for stations which ring on more than one line, for example, a secretary's station. Each line which may be accessed by a secretary's station will have a relay corresponding to relay KR in FIG. 5 and work contacts (not shown) of each such KR relay will be connected through a diode OR gate (not shown) to a separate common audible supply, not shown, at the secretary's station. The contact of the respective KR relay remains closed whenever the corresponding line is in the ringing state, i.e., during both the silent and active interval of ringing.

Gates G17 and G18 are arranged as a flip-flop and gate G19 drives common audible relay KR whenever CA flip-flop is set. Flip-flop CA is set whenever the line is in a ringing state, i.e., during both the active and silent interval of ringing for the line. The CA flip-flop is cleared whenever an A lead ground is applied by the station going off-hook. The common audible circuit is selected by the processor energizing the circuit select lead SEL and lead RBCK. The state of the signal on lead RB then determines into which state the CA flip-flop will be placed; a high signal appears on lead RB when the line is in the ringing state. When the CA flip-flop is set, the output of gate G17 enables gate G13 to deliver flash control signals through gate G14 to the SCR driving circuit of FIG. 7.

The operation of gates G8, G9 and G10 has previously been described for the case when the special feature control signal on lead AD10* was high signifying that no special feature is provided when the subscriber desires to have a special feature such as music-on-hole service. When this service is provided, the line port-switches 201D, 201S of the held line must be operated to connect the held line to a music trunk circuit (not shown) via the time division communications bus.

It was stated above that when lead AD10* is high (special service not active) lead SSKL follows the state of lead LCG—except when the line is on hold—in which case lead SSKL reflects an off-hook condition to the scanner bus SS. Accordingly, the processor monitoring the scanner bus SS cannot tell whether the line is really off-hook or on hold. Ordinarily, it is not necessary for the processor to distinguish these two conditions. In accordance with an aspect of the operation of the circuit of my invention, however, it is desirable in some cases to allow the processor to distinguish between a genuine off-hook and existence of the hold condition. For example, let it be assumed that the subscriber at telephone set 565 is connected to line circuit 570 and then operates the hold button to place circuit 570 on hold. Let it be assumed that the subscriber desires that the remote party to whom he had been talking over the time division communications bus shall have music during the interval of the holding condition. To enable the processor to distinguish between the presence of a holding condition (when music could properly be given to the held party) and an off-hook condition (when music would be entirely inappropriate), lead AD10* is provided to inhibit gate G8 from reporting the true line state to gate G9. When lead AD10* is activated the output of gate G8 is forced high thereby enabling gate G9 to report the state of the HFF to gate G10. When the line is in a holding state, the output of gate G4 will be low causing the output of G9 to be high and allowing gate G10 to drive lead SSKL low when lead BS is strobed. Accordingly, if lead SSKL, and the scan bus SS to which it is connected, is low when lead AD10* is driven low by the processor, the processor is reassured that a true holding condition is present and may then connect the remote party to a music trunk. Accordingly, with the circuitry of FIG. 5, the same scan point bus SS may be used to detect regular loop current or hold conditions. Otherwise, a separate scan point will be required to distinguish between loop current incident to an off-hook and the existence of the holding state.

What has been described is considered to be illustrative of the principles of my invention. Numerous other embodiments may be devised by one skilled in the art without departing from the spirit and scope thereof.

What is claimed is:

1. A switching system line circuit for flexibly serving either a telephone station not having a A lead or a key telephone station which grounds its A lead to pick up a line and which open-circuits its A lead to place the line on hold, said line circuit comprising a pair of flip-flop means each capable of exhibiting a plurality of stable states, means for placing both of said flip-flop means in the first stable state when said A lead is grounded, means for effectively coupling an output of the first of said flip-flop means to an input of the second of said flip-flop means only when said first flip-flop means is in the first of its stable states, scan point means for normally reporting the switchhook state of the telephone set to said switching system, means operable to override said reporting by said scan point means and for substituting a predetermined report, and means for effectively coupling an output of said second flip-flop means to operate said operable means only when said second flip-flop means is in the second of its stable states.

2. A switching system line circuit according to claim 1 wherein said first and said second flip-flop means are settable to the second stable state only when said A lead is not grounded, said line circuit further comprising, means for delaying the operation of said means for placing said first and said second flip-flop means in said first or said second stable states when said telephone station changes its switchhook state.

3. A switching system line circuit for serving either a telephone station not having an A lead or a key telephone station which grounds its A lead to pick up a line and whicn open-circuits its A lead to place the line on hold, said line circuit comprising gating means for normally ascertaining the correct state of said telephone station switchhook regardless of the state of said A lead, and means for forcing said gating means to report an off-hook switching state when said A lead undergoes a change from grounded to open at a time when said switchhook state is off-hook.

4. A switching system line circuit according to claim 3 wherein said forcing means includes a pair of flip-flop means each having a pair of inputs, one input of said first flip-flop means being connected to monitor the state of said telephone station switchhook, one input of said second flip-flop means being connected to monitor the output of said first flip-flop means, the other input of said first and of said second flip-flop means being connected to monitor the state of said A lead, and an output of said second flip-flop means being connected to control said gating means.

5. The combination according to claim 4 further comprising delay means connected at said other input of said first and second flip-flop means for delaying the response thereof when a simultaneous change occurs at said one input of said first flip-flop means.

6. The combination according to claim 4 wherein said telephone station includes a pick-up key line lamp, and means controlled by the outputs of said second flip-flop means for selectively steering lamp illumination potential to said line lamp.

7. A line circuit for serving either a telephone station not having an A lead or a key telephone station which grounds its A lead to pick up a line and which open-circuits its A lead to place the line on hold, comprising first (LCFF) tri-stable state means settable to its first 0 state when said A is grounded, settable to its second 1 state when said station is on-hook and settable to its third 2 state when said station is on-hook and said A lead is grounded, and second (HFF) tri-stable state means settable to its first 0 state when said A lead is grounded, settable to its second 1 state when said first tri-stable state means is in either its second or third stable state, and settable to its third 2 state when said A lead is grounded and said first tri-stable state means is in either its second or third stable state.

8. A line circuit for serving either a telephone station not having an A lead or a key telephone set which grounds its A lead to pick up a line and which open-circuits its A lead to place the line on hold, comprising a pair of tri-stable state means, means for setting both of said tri-stable state means to their respective first 0 state when said A lead is grounded, means for setting the first of said tri-stable state means to its second 1 state when said station is on-hook, and means for setting the second of said tri-stable state means to its second 1 state when said first tri-stable state means is in its second stable state, both said first tri-stable state means and said second tri-stable means being respectively settable to the third 2 stable state when both said respective sets of means for setting said respective tri-stable state means to the first and second stable states are simultaneously active.

9. A switching system line circuit for serving either a telephone station not having an A lead or a key telephone set which grounds its A lead to pick up a line and which open-circuits its A lead to place the line on hold, said line circuit comprising a pair of tri-stable state means, means for setting both of said tri-stable state means to their respective first 0 state when said A lead is grounded, means for setting said first tri-stable state means to its second 1 state when said station is on-hook, means for setting said second tri-stable state means to its second 1 state when said first tri-stable state means is in its second stable state, both said first tri-stable state means and said second tri-stable means being respectively settable to the third 2 stable state when both said respective sets of means for setting said respective tri-stable state means to the first and second stable states are simultaneously active, and scan point means for normally reporting the switch-hook state of said telephone set to said switching system and output gating means controlled by the state of said second tri-stable state means for selectively modifying the report of said scan point means to said switching system.

10. A line circuit for serving either a telephone station set not having an A lead or a key telephone set having an A lead for placing the circuit in a holding state, comprising means for sensing the telephone set loop current, means for sensing the telephone set A lead, first flip-flop means, second flip-flop means, means for coupling said loop current sensing means to one input of said first flip-flop means, means for connecting said A lead sensing means to the other input of said first flip-flop means and to a first input of said second flip-flop means, means coupling an output of said first flip-flop means to the second input of said second flip-flop means, said flip-flops thereby being settable to define a pair of line busy states, a pair of line holding states, and a pair of line idle states.

11. A circuit for controlling a scan point associable with either a key telephone set having illuminable pick-up keys and an A lead or an ordinary key telephone set having neither illuminable pick-up keys nor an A lead in accordance with the switchhook and A lead states, comprising means for registering the on-hook state of said switchhook, means for registering the picked-up state of said A lead, means for delaying the operation of said A lead state registering means with respect to the operation of said switchhook state registering means, tri-stable state output means settable to a first state only when said switchhook state registering means is not set, settable to a second state when only said A lead state registering means is set and settable to a third state when both said switchhook state registering means is not set and said A lead state registering means is set, key lamp illumination potential steering means connectable to said tri-stable state output means, and means for controlling said scan point in accordance with two of the states of said tri-stable state output means.

* * * * *